United States Patent
Szczepanik et al.

(10) Patent No.: US 11,720,465 B2
(45) Date of Patent: Aug. 8, 2023

(54) DETERMINING DIAGNOSTIC INFORMATION UTILIZING PROGRAM CODE

(71) Applicant: International Business Machines Corporation, Armonk, NY (US)

(72) Inventors: Grzegorz Piotr Szczepanik, Cracow (PL); Piotr Kalandyk, Zielonki (PL); Pawel Tadeusz Januszek, Cracow (PL); Michał Maciej Zalas, Cracow (PL)

(73) Assignee: International Business Machines Corporation, Armonk, NY (US)

( * ) Notice: Subject to any disclaimer, the term of this patent is extended or adjusted under 35 U.S.C. 154(b) by 295 days.

(21) Appl. No.: 17/031,341

(22) Filed: Sep. 24, 2020

(65) Prior Publication Data

US 2022/0091957 A1    Mar. 24, 2022

(51) Int. Cl.
*G06F 11/32* (2006.01)
*G06F 11/07* (2006.01)
(Continued)

(52) U.S. Cl.
CPC ........ *G06F 11/321* (2013.01); *G06F 11/0787* (2013.01); *G06F 16/338* (2019.01);
(Continued)

(58) Field of Classification Search
CPC .............. G06F 11/321; G06F 11/0787; G06F 16/3329; G06F 16/3344; G06F 16/338; H04L 51/02
(Continued)

(56) References Cited

U.S. PATENT DOCUMENTS

| 7,409,336 B2 | 8/2008 | Pak | |
| 2004/0153823 A1* | 8/2004 | Ansari | G06F 11/0793 |
| | | | 714/38.14 |

(Continued)

FOREIGN PATENT DOCUMENTS

| CN | 103309809 A | 9/2013 |
| CN | 108804456 A | 11/2018 |
| CN | 111026581 A | 4/2020 |

OTHER PUBLICATIONS

Wikipedia "patch (computing)" pages, retrieved from https://en.wikipedia.org/wiki/Patch_(computing) (Year: 2023).*

(Continued)

*Primary Examiner* — Yair Leibovich
(74) *Attorney, Agent, or Firm* — David K. Mattheis

(57) ABSTRACT

Aspects of the present invention disclose a method, computer program product, and system for determining a response to a query from a user. The method includes one or more processors receiving a query associated with a software product. The query includes an indication of an error. The method further includes one or more processors determining whether a response to the query is available in an accessible knowledge base. In response to determining that a response to the query is not available, the method further includes one or more processors identifying content in program code of the software product that corresponds to the indicated error of the received query. The method further includes one or more processors determining a response to the query based on the identified content in the program code. The determined response to the query includes diagnostic information corresponding to the indicated error.

18 Claims, 3 Drawing Sheets

(51) Int. Cl.
    *H04L 51/02*     (2022.01)
    *G06F 16/332*     (2019.01)
    *G06F 16/338*     (2019.01)
    *G06F 16/33*     (2019.01)

(52) U.S. Cl.
    CPC ...... *G06F 16/3329* (2019.01); *G06F 16/3344* (2019.01); *H04L 51/02* (2013.01)

(58) Field of Classification Search
    USPC .......................................................... 714/46
    See application file for complete search history.

(56) References Cited

U.S. PATENT DOCUMENTS

| | | | |
|---|---|---|---|
| 2006/0074597 A1* | 4/2006 | Raphael | G06F 11/0793 702/183 |
| 2015/0088765 A1 | 3/2015 | Fulton | |
| 2018/0203755 A1 | 7/2018 | Das | |
| 2019/0171758 A1 | 6/2019 | Pinel | |
| 2019/0179688 A1 | 6/2019 | Angermayer | |
| 2019/0306327 A1 | 10/2019 | Matysiak | |
| 2020/0073960 A1* | 3/2020 | Hiekata | G06F 16/24578 |

OTHER PUBLICATIONS

"Code Analysis Bot CAB", © 2020 Automation Anywhere, Inc., Bot Store, 7 pps., <https://botstore.automationanywhere.com/bot/code-analysis-bot-cab/>.
"Code Knowledge Categories SciTools", © Copyright 1996-2020 Scientific Toolworks, Inc., 2 pps., <https://scitools.com/feature-category/code-knowledge/>.
"PVS-Studio Analyzer", © 2020, OOO "Program Verification Systems", 12 pps., <https://www.viva64.com/en/pvs-studio/>.
"Virtual Assistant for Knowledge Management", © 2017-2020 Konverso | All rights reserved, 7 pps., <https://www.konverso.ai/virtual-assistant-for-knowledge-management/>.
Parlo, "The 3 Essentials of AI Bots for IT Help Desk", Dec. 20, 2017, 8 pps., <https://chatbotsmagazine.com/the-3-essentials-of-ai-bots-for-it-help-desk-9bce2ffa4446>.
Roy, "How Conversational AI is Driving the Future of IT Service Management", © 2020 Kore.ai, Inc., 9 pps., <https://blog.kore.ai/how-conversational-ai-is-driving-the-future-of-it-service-management>.
International Search Report and Written Opinion dated Oct. 18, 2021 from PCT Application No. PCT/CN2021/107366 filed Jul. 20, 2021.

* cited by examiner

DETERMINING DIAGNOSTIC INFORMATION UTILIZING PROGRAM CODE

BACKGROUND OF THE INVENTION

The present invention relates generally to the field of data analytics, and more particularly to a diagnostic method and service.

Messaging applications (e.g., social messaging, chat applications, etc.) are applications and platforms that enable messaging on the Internet on a broad array of platforms. Messaging applications exist for social networking platforms or other instant messaging services, and also are developed for specific uses, such as chatbots, payments, e-commerce chats, etc. Messaging applications are some of the most widely utilized applications for smartphones.

A dialogue system, or conversational agent (CA), is a computer system intended to converse with a human. Dialogue systems employed one or more of text, speech, graphics, haptics, gestures, and other modes for communication on both the input and output channel. A chatbot is a piece of software that conducts a conversation via auditory or textual methods. Such programs are often designed to convincingly simulate how a human would behave as a conversational partner. Chatbots are typically used in dialog systems for various practical purposes including customer service or information acquisition. Some chatbots use sophisticated natural language processing (NLP) systems, while others can utilize more simple methods (e.g., responses based on keyword identification, etc.).

In computer programming, an error code (or a return code) is a numbered or alphanumeric code that is used to determine the nature of an error, and why the error occurred. Error codes are also commonly found in consumer electronics and devices when a device attempts to do something that the device cannot. Error codes can also be passed off to error handlers that determine what action to take.

SUMMARY

Aspects of the present invention disclose a method, computer program product, and system for determining a response to a query from a user. The method includes one or more processors receiving a query associated with a software product. The query includes an indication of an error. The method further includes one or more processors determining whether a response to the query is available in an accessible knowledge base. In response to determining that a response to the query is not available, the method further includes one or more processors identifying content in program code of the software product that corresponds to the indicated error of the received query. The method further includes one or more processors determining a response to the query based on the identified content in the program code. The determined response to the query includes diagnostic information corresponding to the indicated error.

DETAILED DESCRIPTION

Embodiments of the present invention can provide a chatbot to automatically review source code of a software product to identify information that is relevant to formulating an answer to a received query. Accordingly, embodiments of the present invention can operate and provide a chatbot (or other questions and answer system and method) that does not require comprehensive documentation for a supported software product (e.g., documentation and instructions prepared by a human operator) to determine responses to queries, which can operate to reduce system cost and increase system speed and throughput.

Some embodiments of the present invention recognize that chatbots (e.g., virtual assistant) are commonly used for supporting software products. In various scenarios, a chatbot can operate utilizing knowledge contained within product documentation, such as manuals, guides, technotes, other support cases (e.g., tickets), frequently asked questions list (FAQ), etc. Embodiments of the present invention recognize that creating such knowledge bases is time consuming and requires dedicated efforts. Accordingly, embodiments of the present invention recognize that in many scenarios, a knowledge base is not complete and up to date, which can limit or reduce the accuracy of answers from a chatbot. A common class of question received by a product support chatbot is about the meaning of an error code reported by the software product. Embodiments of the present invention recognize that, while providing such answer is trivial for a chatbot when error code is described in documentation, there is difficulty when the error code is not clearly represented and described in the documentation.

Embodiments of the present invention can operate to receive a query associated with a software product. In response to determining that a response to the query is not readily available (e.g., in an existing knowledge based associated with the software product), embodiments of the present invention can identify program code of the software product and identify content from the received query in the program code. Then, embodiments of the present invention can operate to determine a response to the query, based on the identified content, and provide the response to a corresponding requesting user (e.g., the user that submitted the query).

Implementation of embodiments of the invention may take a variety of forms, and exemplary implementation details are discussed subsequently with reference to the Figures.

Figure 1:
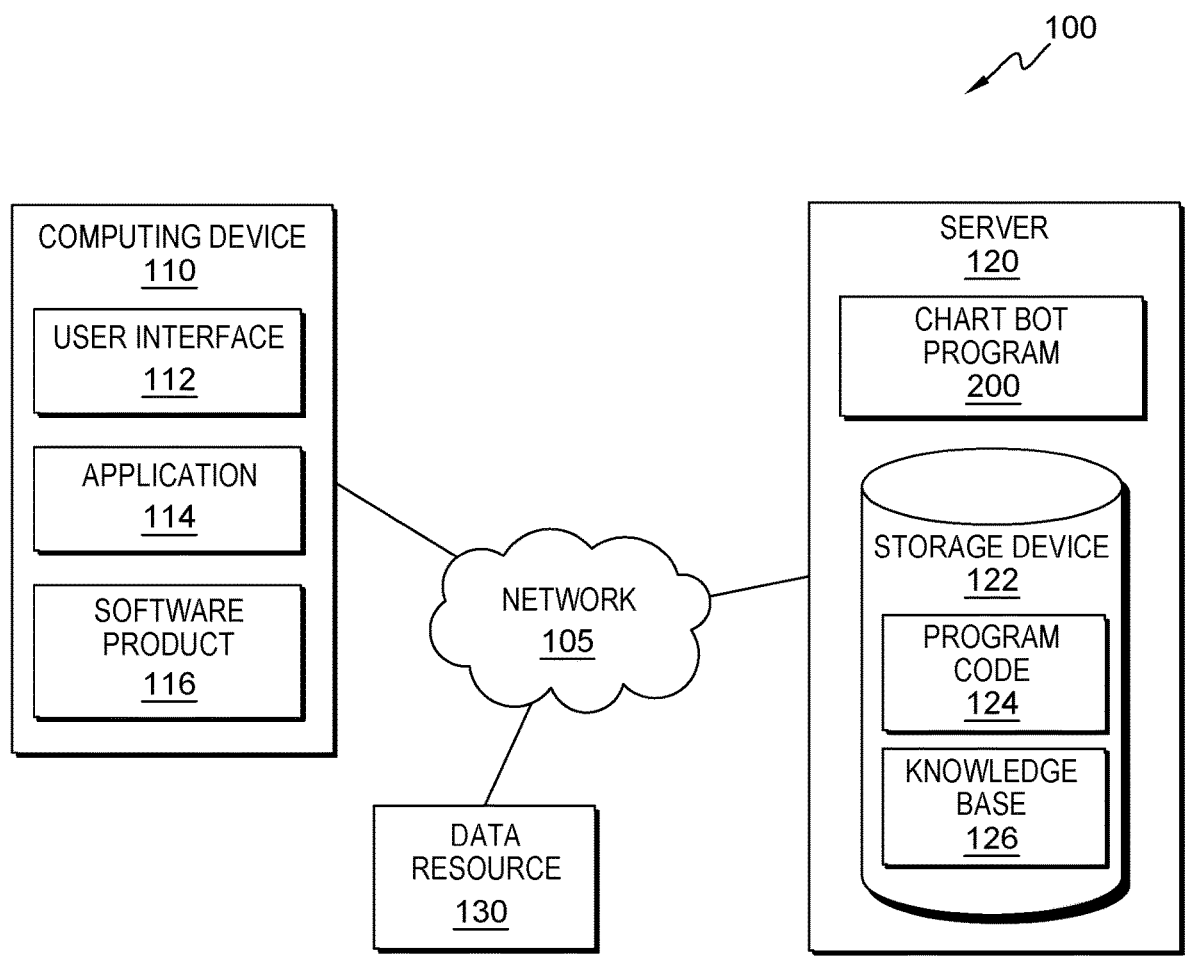
FIG. 1 is a functional block diagram of a data processing environment, in accordance with an embodiment of the present invention.

The present invention will now be described in detail with reference to the Figures. FIG. 1 is a functional block diagram illustrating a distributed data processing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

An embodiment of data processing environment 100 includes computing device 110 and server 120, interconnected over network 105. In an example embodiment, server 120 is representative of a computing device (e.g., one or more management servers) that provides customer support and troubleshooting services (e.g., a support chatbot, a virtual assistant, etc.) to one or more organizations and users, such as users associated with computing device 110. In other embodiments, data processing environment 100 can include additional instances of computing devices (not shown) that can interface with server 120, in accordance with various embodiments of the present invention.

Network 105 can be, for example, a local area network (LAN), a telecommunications network, a wide area network (WAN), such as the Internet, or any combination of the three, and include wired, wireless, or fiber optic connections. In general, network 105 can be any combination of connections and protocols that will support communications between computing device 110 and server 120, in accordance with embodiments of the present invention. In various embodiments, network 105 facilitates communication among a plurality of networked computing devices (e.g., computing device 110 and other devices not shown), corresponding users (e.g., users of computing device 110, server 120, etc.), and corresponding management services and/or network-accessible resources (e.g., server 120 and data resource 130).

In various embodiments of the present invention, computing device 110 may be a workstation, personal computer, personal digital assistant, mobile phone, or any other device capable of executing computer readable program instructions, in accordance with embodiments of the present invention. In general, computing device 110 is representative of any electronic device or combination of electronic devices capable of executing computer readable program instructions. Computing device 110 may include components as depicted and described in further detail with respect to FIG. 3, in accordance with embodiments of the present invention.

In an example embodiment, computing device 110 is a personal workstation or mobile device associated with (e.g., registered to) a user utilizing a software product (e.g., software product 116) that sends a query to server 120. For example, a user of computing device 110 encounters an error while utilizing software product 116 and sends a query (to server 120) regarding the encountered error.

Computing device 110 includes user interface 112, application 114, and software product 116. User interface 112 is a program that provides an interface between a user of computing device 110 and a plurality of applications that reside on the device (e.g., application 114). A user interface, such as user interface 112, refers to the information (such as graphic, text, and sound) that a program presents to a user, and the control sequences the user employs to control the program. A variety of types of user interfaces exist. In one embodiment, user interface 112 is a graphical user interface. A graphical user interface (GUI) is a type of user interface that allows users to interact with electronic devices, such as a computer keyboard and mouse, through graphical icons and visual indicators, such as secondary notation, as opposed to text-based interfaces, typed command labels, or text navigation. In computing, GUIs were introduced in reaction to the perceived steep learning curve of command-line interfaces which require commands to be typed on the keyboard. The actions in GUIs are often performed through direct manipulation of the graphical elements. In another embodiment, user interface 112 is a script or application programming interface (API).

Application 114 can be representative of one or more applications (e.g., an application suite) that operate on computing device 110. In various example embodiments, application 114 can be an application that a user of computing device 110 utilizes to send and/or receive data from server 120. In another example embodiment, application 114 can be an application associated utilizing software product 116. In an example, application 114 is a web browser that the user of computing device 110 can access and utilize. In another example, application 114 is an enterprise-specific application, associated with server 120 and/or the corresponding organization (e.g., associated with products offered by an enterprise). In an example scenario, a user of computing device 110 can utilize application 114 to establish a chat session with server 120 (e.g., a chatbot of server 120 and/or chatbot program 200) to communicate regarding software product 116.

Software product 116 can be representative of a program or application, operating on computing device 110, that a user of computing device 110 can utilize in accordance with various embodiments of the present invention. In an additional aspect, software product 116 corresponds to program code 124, on server 120 (i.e., program code 124 includes source code of software product 116).

In example embodiments, server 120 can be a desktop computer, a computer server, or any other computer systems, known in the art. In certain embodiments, server 120 represents computer systems utilizing clustered computers and components (e.g., database server computers, application server computers, etc.) that act as a single pool of seamless resources when accessed by elements of data processing environment 100 (e.g., computing device 110 and other devices not shown). In general, server 120 is representative of any electronic device or combination of electronic devices capable of executing computer readable program instructions. Server 120 may include components as depicted and described in further detail with respect to FIG. 3, in accordance with embodiments of the present invention.

Server 120 includes chatbot program 200 and storage device 122, which includes program code 124 and knowledge base 126. In various embodiments, server 120 operates as a computing system that provides customer support and troubleshooting services (e.g., a support chatbot, a virtual assistant, etc.) to one or more organizations and users, such as users associated with computing device 110. For example, server 120 hosts chatbot services, including chatbot program 200. In additional embodiments, server 120 includes, or has access to, syntax and semantic analysis capabilities to utilize in accordance with various aspects of the present invention (e.g., in combination with operations of chatbot program 200). In another embodiment, server 120 can also include, or have access to, natural language processing (NLP) capabilities to utilize in accordance with various aspects of the present invention (e.g., in combination with operations of chatbot program 200).

In example embodiments, chatbot program 200 automatically determines and provides a response to a query from a user, associated with a software product, in accordance with embodiments of the present invention. In various embodiments, server 120 can utilize chatbot program 200 to manage a portion of operations of a chatbot associated with software product 116. Chatbot program 200 receives a query associated with a software product. In response to determining that a response to the query is not readily available (e.g., in an existing knowledge based associated with the software product), chatbot program 200 identifies program code of the software product and identifies content from the received query in the program code. Then, chatbot program 200 determines a response to the query, based on the identified content, and provides the response to a corresponding requesting user (e.g., the user that submitted the query).

In various embodiments of the present invention, the user of computing device 110 can register with server 120 (e.g., via a corresponding application). For example, the user completes a registration process, provides information, and authorizes the collection and analysis (i.e., opts-in) of relevant data provided by at least computing device 110, by server 120 (e.g., user profile information, user contact information, authentication information, usage information foe a software product, user preferences, or types of information, for server 120 utilize with chatbot program 200). In various embodiments, a user can opt-in or opt-out of certain categories of data collection. For example, the user can opt-in to provide all requested information, a subset of requested information, or no information. In additional embodiments, the user of computing device 110 can define which information that server 120 can utilize in determining responses to queries from computing device 110, in accordance with embodiments of the present invention.

Storage device 122 can be implemented with any type of storage device, for example, persistent storage 305, which is capable of storing data that may be accessed and utilized by server 120, such as a database server, a hard disk drive, or a flash memory. In other embodiments, storage device 122 can represent multiple storage devices and collections of data within server 120. In various embodiments, server 120 can utilize storage device 122 to store information and data associated with software product 116 (e.g., software operating on an external device, such as computing device 110).

Program code 124 is representative of computer code that corresponds to software product 116 (e.g., on computing device 110). In another embodiment, server 120 can host a product or service that includes program code 124 and software product 116. In this embodiment, computing device 110 can download software product 116 from server 120, while server 120 maintains a respective copy of program code 124, which directly corresponds to software product 116 on computing device 110. In an example embodiment, program code 124 includes source code of software product 116. In an additional embodiment, a creator of software product 116 can authorize server 120 to utilize program code 124 in the processing steps of chatbot program 200 (depicted in FIG. 2), in accordance with various embodiments of the present invention.

In example embodiments, knowledge base 126 includes accumulated data corresponding to software product 116 and program code 124. For example, knowledge base 126 can include available known data associated with software product 116 and program code 124, such as product documentation, manuals, guides, technotes, other support cases (e.g., tickets), frequently asked questions list (FAQ), etc. In additional embodiments, knowledge base 126 can include information determined through execution of chatbot program 200. For example, in response to determining a response to a query that was not present in knowledge base 126, chatbot program 200 can add the determined response to knowledge base 126 for future use. In example embodiments, knowledge base 126 can include a plurality of error codes and corresponding meanings of the error codes (and troubleshooting instructions) that correspond to software product 116 (and program code 124).

Data resource 130 is representative of one or more locations of information that are network-accessible (e.g., over network 105) to server 120. In one embodiment, data resource 130 is a public data source that includes information that is relevant to use of software product 116 and program code 124. For example, data resource 130 can be a website that includes questions and answers associated with software product 116 (and program code 124). In an additional embodiment, data resource 130 can include debugging information for one or more software products, such as software product 116. In a further embodiment, data resource 130 can include a database of code comments, corresponding descriptions of code comments, error information, questions and answers, etc. In various embodiments, server 120 can search data resource 130 utilizing NLP analysis, syntax analysis, semantic analysis, or other analytical capabilities available to server 120, in accordance with various embodiments of the present invention.

Figure 2:
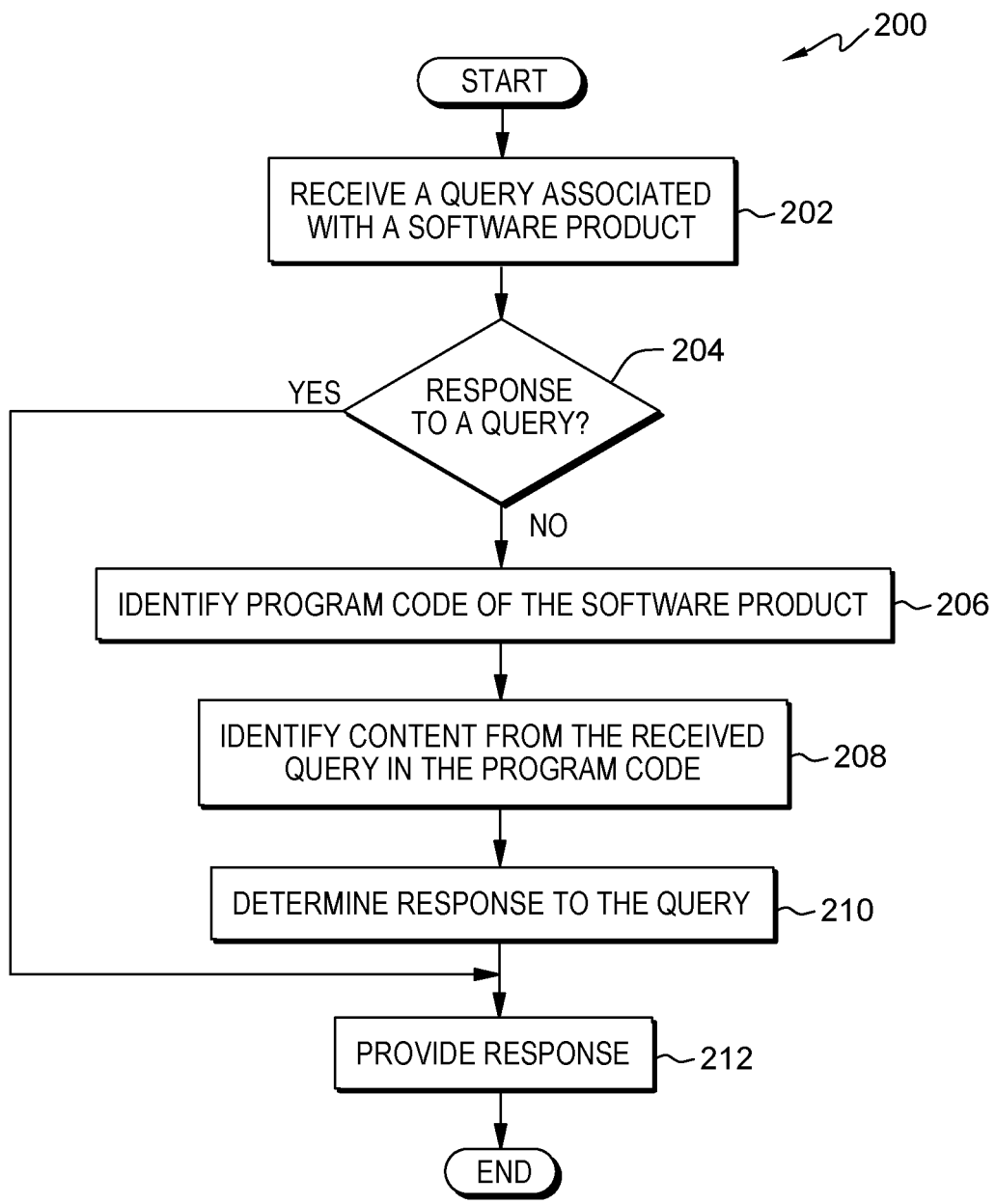
FIG. 2 is a flowchart depicting operational steps of a program for determining and providing a response to a query from a user, associated with a software product, in accordance with embodiments of the present invention.

FIG. 2 is a flowchart depicting operational steps of chatbot program 200, a program for determining and providing a response to a query from a user, associated with a software product, in accordance with embodiments of the present invention. In one embodiment, chatbot program 200 initiates in response to receiving a query (e.g., from a user of computing device 110). In another embodiment, chatbot program 200 can operate as a background process (on server 120), waiting for queries from users. For example, chatbot program 200 operates as an aspect of a chatbot and troubleshooting service, facilitated by server 120, in accordance with various embodiments of the present invention.

In step 202, chatbot program 200 receives a query associated with a software product. In one embodiment, chatbot program 200 receives a query associated with software product 116 from computing device 110. In example embodiments, chatbot program 200 operates as an aspect of a question and answer chatbot on server 120. In this example embodiment, chatbot program 200 (and the corresponding chatbot) receives a query (e.g., a question) from a user of computing device 110. In another embodiment, chatbot program 200 can receive queries in natural language, and utilize NLP analysis techniques to identify content in the query (e.g., question intent, keywords, error codes, etc.). In various embodiments, chatbot program 200 (and server 120) can receive a variety of query types (and other forms of data requests), based on the operations and interactions of software product 116.

In an example scenario, a user of computing device 110 is utilizing software product 116 and encounters an error. Accordingly, software product 116 presents an error message that includes "Error: A44Z." In this example scenario, the user of computing device 110 initiates a messaging session with a chatbot on server 120 and sends a query that includes the presented error code. For example, the user of computing device 110 can submit a natural language query to the chatbot that states "What does Error: A44Z mean?" and chatbot program 200 receives the submitted natural language query.

In decision step 204, chatbot program 200 determines whether a response to the query is available. In one embodiment, chatbot program 200 determines whether knowledge base 126 includes a response that corresponds to the received query (received in step 202). In example embodiments, knowledge base 126 includes accumulated data corresponding to software product 116 and program code 124. For example, knowledge base 126 can include available known data associated with software product 116 and program code 124, such as product documentation, manuals, guides, technotes, other support cases (e.g., tickets), frequently asked questions list (FAQ), etc. In additional embodiments, knowledge base 126 can include information determined through execution of chatbot program 200. In example embodiments, knowledge base 126 can include a plurality of error codes and corresponding meanings of the error codes (and troubleshooting instructions) that correspond to software product 116 (and program code 124).

In one embodiment, chatbot program 200 parses and analyzes the received query to identify keywords and phrases to utilize in searching for a response to the query. Then, chatbot program 200 can search available resources (e.g., knowledge base 126) for an existing response to the query. For example, chatbot program 200 searches knowledge base 126 for a description, or troubleshooting instructions, corresponding to "Error: A44Z."

In one aspect, chatbot program 200 searches knowledge base and locates a response to a query received in step 202. In this aspect, in response to determining that the response to the query is available (decision step 204, YES branch), chatbot program 200 provides the response (step 212).

In another aspect, chatbot program 200 searches knowledge base and does not locate a response to a query received in step 202. For example, chatbot program 200 searches knowledge base 126 (and other accessible information resources that are associated with software product 116) and does not find an indication of a response (e.g., a description, troubleshooting instructions, etc.) to the query. With respect to the previously discussed example scenario, chatbot program 200 determines that knowledge base 126 does not include a description, or troubleshooting instructions, corresponding to "Error: A44Z." In this aspect, in response to determining that a response to the query is not available (decision step 204, NO branch), chatbot program 200 identifies program code of the software product (step 206).

In step 206, chatbot program 200 identifies program code of the software product. More specifically, in response to determining that a response to the query (received in step 202) is not available (decision step 204, NO branch), chatbot program 200 identifies program code 124, which corresponds to software product 116 (step 206). In various embodiments, program code 124, stored on storage device 122, is representative of computer code that corresponds to software product 116 (e.g., on computing device 110). In an example embodiment, program code 124 includes source code of software product 116.

In step 208, chatbot program 200 identifies content from the received query in the program code. In one embodiment, chatbot program 200 searches program code 124 for information included in the received query (e.g., an error code from the query, a keyword, or other request/issue included in the received query). In various embodiments, chatbot program 200 can analyze and search program code 124 utilizing NLP analysis, syntax analysis, semantic analysis, or other analytical capabilities available to server 120, in accordance with various embodiments of the present invention.

In an example embodiment, chatbot program 200 can perform a semantic and/or syntax analysis on program code 124 utilizing a hook-to-static program analysis engine to search for information in program code 124 that is associated with resolving the query. In another embodiment, chatbot program 200 can identify a comment in program code 124 that includes information relevant to the received query (e.g., mentions an error code in the query). In this embodiment, chatbot program 200 can search network-accessible resources (e.g., data resource 130) for information (e.g., a description, troubleshooting instructions, etc.) included in the identified comment. For example, chatbot program 200 can use NLP analysis/understanding and tone analysis of the comment to identify relevant information included in data resource 130.

In the previously discussed example scenario, the user of computing device 110 sends a query that mentions "Error: A44Z." In this example scenario, chatbot program 200 reviews program code 124, searching for the error code "Error: A44Z." Chatbot program 200 identifies the error code within program code 124 and can then identify and analyze comments that are in proximity to the error code location in program code 124. In the example scenario, chatbot program 200 can analyze the identified comments (e.g., using NLP analysis, syntax analysis, semantic analysis, etc.) to identify information relevant to the meaning of the error code. In addition, chatbot program 200 can also access and analyze additional data sources (e.g., data resource 130, or other relevant files and text resources and repositories) that include information associated with software product 116 and program code 124 for information relevant to the error code.

In step 210, chatbot program 200 determines a response to the query. In one embodiment, chatbot program 200 determines a response to the query that includes corresponding diagnostic information, based on the identified content in program code 124. For example, chatbot program 200 determines a response that includes a comment that explains the meaning of an error code (e.g., based on a comment identified in program code 124). In another embodiment, chatbot program 200 can generate a set of diagnostic information for the response to include information determined from program code 124 (e.g., data recited in comments of the source code) and information from data resource 130 (e.g., an explanation of an error code, corresponding troubleshooting information, etc.).

In an example embodiment, chatbot program 200 searches program code 124 for a response to the received query associated with software product 116. For example, chatbot program 200 searches program code 124 for information associated with "Error: A44Z." Chatbot program 200 can identify a comment in program code 124 that is associated with "Error: A44Z" (e.g., a comment that mentions the error code, a comment in proximity to the program code to display the error code, etc.). In this example embodiment, chatbot program 200 can analyze program code 124 and the identified comments (e.g., using NLP analysis, syntax analysis, semantic analysis, etc.) to identify diagnostic information to include in a response to the query to the user of computing device 110.

In another example embodiment, chatbot program 200 searches and/or queries data resource 130 (or another accessible information resource) for information that is relevant to a response to the received query associated with software product 116. For example, chatbot program 200 searches data resource 130 for information associated with "Error: A44Z." In an example aspect, if chatbot program 200 determines that analyzing (e.g., semantic/syntax analysis) the content of program code 124 does not result in a response to the query, then chatbot program 200 can search data resource 130. In another example aspect, chatbot program 200 can search data resource in addition to analyzing the content of program code 124 (e.g., for additional clarification). In this example embodiment, chatbot program 200 identify a comment in program code 124 that is associated with "Error: A44Z," and then compare the identified comment (and error code) against accessible resources, such as data resource 130. Accordingly, chatbot program 200 can identify diagnostic information in data resource 130 that corresponds to "Error: A44Z" and software product 116.

In various embodiments, chatbot program 200 generates a response to the query to include diagnostic information for the user. In the previously discussed example scenario, chatbot program 200 received a query from the user of computing device 110 that includes "Error: A44Z" for software product 116. Chatbot program 200, based on analyzing program code 124 and/or data resource 130, can generate diagnostic information that includes information explaining the meaning of an error and/or information associated with resolving the error. For example, chatbot program 200 determines that "Error: A44Z" corresponds to "insufficient disk space on partition." Chatbot program 200 can determine a response to the query that includes the error code definition of "insufficient disk space on partition." In additional aspects, chatbot program 200 can determine a response to the query that includes troubleshooting instructions to assist the user of computing device 110 in resolving the error of "insufficient disk space on partition."

In step 212, chatbot program 200 provides the response. In one embodiment, chatbot program 200 provides the response (determined in step 210) to the query (received in step 202) to the user of computing device 110. In example embodiments, chatbot program 200 can provide the generated diagnostic information in the messaging session between server 120 and the user of computing device 110. For example, chatbot program 200 can provide a response that indicates that "Error: A44Z" corresponds to "insufficient disk space on partition." In addition, chatbot program 200 can provide a response to the query that includes troubleshooting instructions to assist the user of computing device 110 in resolving the error of "insufficient disk space on partition."

In another embodiment, chatbot program 200 can add the determined response to the query to knowledge base 126, for future use in supporting software product 116 (and execution of chatbot program 200). For example, chatbot program 200 can receive feedback from the user of computing device 110 that the response to the query is accurate and satisfactory. Accordingly, chatbot program 200 can then add the authorized response to knowledge base 126, for utilization in future instances and operations of chatbot program 200 (performing decision step 204).

In one aspect, chatbot program 200 searches knowledge base (in decision step 204) and locates a response to a query received in step 202. In this aspect, in response to determining that the response to the query is available (decision step 204, YES branch), chatbot program 200 provides the response (step 212).

Figure 3:
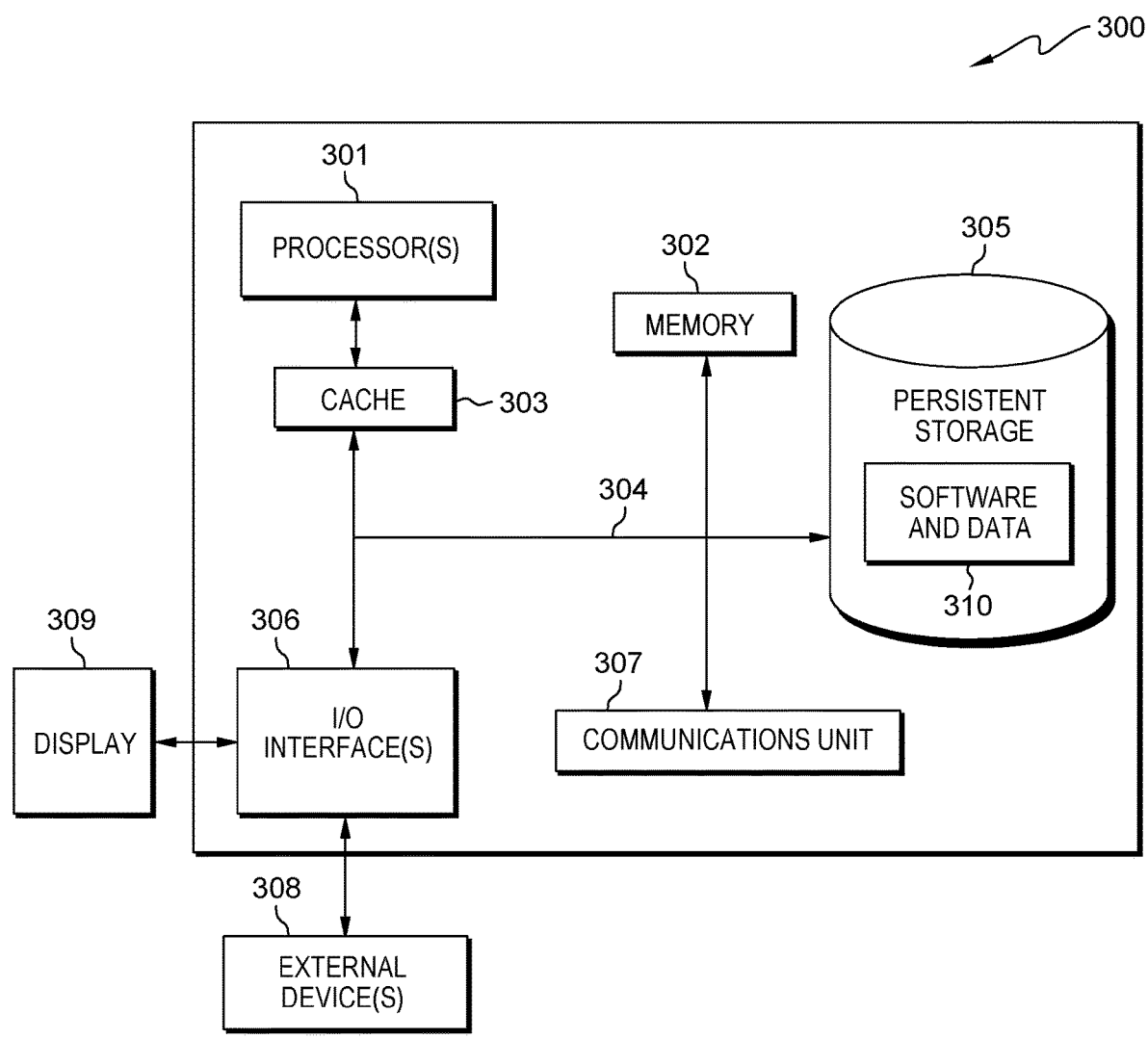
FIG. 3 depicts a block diagram of components of a computing system representative of the client devices and server of FIG. 1, in accordance with an embodiment of the present invention.

FIG. 3 depicts computer system 300, which is representative of computing device 110 and server 120, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made. Computer system 300 includes processor(s) 301, cache 303, memory 302, persistent storage 305, communications unit 307, input/output (I/O) interface(s) 306, and communications fabric 304. Communications fabric 304 provides communications between cache 303, memory 302, persistent storage 305, communications unit 307, and input/output (I/O) interface(s) 306. Communications fabric 304 can be implemented with any architecture designed for passing data and/or control information between processors (such as microprocessors, communications and network processors, etc.), system memory, peripheral devices, and any other hardware components within a system. For example, communications fabric 304 can be implemented with one or more buses or a crossbar switch.

Memory 302 and persistent storage 305 are computer readable storage media. In this embodiment, memory 302 includes random access memory (RAM). In general, memory 302 can include any suitable volatile or non-volatile computer readable storage media. Cache 303 is a fast memory that enhances the performance of processor(s) 301 by holding recently accessed data, and data near recently accessed data, from memory 302.

Program instructions and data (e.g., software and data 310) used to practice embodiments of the present invention may be stored in persistent storage 305 and in memory 302 for execution by one or more of the respective processor(s) 301 via cache 303. In an embodiment, persistent storage 305 includes a magnetic hard disk drive. Alternatively, or in addition to a magnetic hard disk drive, persistent storage 305 can include a solid state hard drive, a semiconductor storage device, a read-only memory (ROM), an erasable programmable read-only memory (EPROM), a flash memory, or any other computer readable storage media that is capable of storing program instructions or digital information.

The media used by persistent storage 305 may also be removable. For example, a removable hard drive may be used for persistent storage 305. Other examples include optical and magnetic disks, thumb drives, and smart cards that are inserted into a drive for transfer onto another computer readable storage medium that is also part of persistent storage 305. Software and data 310 can be stored in persistent storage 305 for access and/or execution by one or more of the respective processor(s) 301 via cache 303. With respect to computing device 110, software and data 310 includes user interface 112 and application 114. With respect to server 120, software and data 410 includes chatbot program 200, program code 124, and knowledge base 126.

Communications unit 307, in these examples, provides for communications with other data processing systems or devices. In these examples, communications unit 307 includes one or more network interface cards. Communications unit 307 may provide communications through the use of either or both physical and wireless communications links. Program instructions and data (e.g., software and data 310) used to practice embodiments of the present invention may be downloaded to persistent storage 305 through communications unit 307.

I/O interface(s) 306 allows for input and output of data with other devices that may be connected to each computer system. For example, I/O interface(s) 306 may provide a connection to external device(s) 308, such as a keyboard, a keypad, a touch screen, and/or some other suitable input device. External device(s) 308 can also include portable computer readable storage media, such as, for example, thumb drives, portable optical or magnetic disks, and memory cards. Program instructions and data (e.g., software and data 310) used to practice embodiments of the present invention can be stored on such portable computer readable storage media and can be loaded onto persistent storage 305 via I/O interface(s) 306. I/O interface(s) 306 also connect to display 309.

Display 309 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
receiving, by one or more processors, a query associated with a software product, the query including an indication of an error;
determining, by one or more processors, whether a response to the query is available in an accessible knowledge base;
in response to determining that a response to the query is not available in an accessible knowledge base, identifying, by one or more processors, content in program code of the software product that corresponds to the indicated error of the received query, wherein the content comprises a comment in the program code that includes an error code that corresponds to the indicated error in the received query; and
determining, by one or more processors, a response to the query based on the identified content in the program code, the determined response to the query including diagnostic information corresponding to the indicated error.

2. The method of claim 1, further comprising:
sending, by one or more processors, the determined response to a user that sent the query, wherein the diagnostic information included in the determined response includes troubleshooting instructions corresponding to the indicated error.

3. The method of claim 1, further comprising:
identifying, by one or more processors, a comment in the program code of the software product that is associated with the indicated error included in the query; and
generating, by one or more processors, diagnostic information corresponding to the indicated error based on analyzing the identified comment in the program code.

4. The method of claim 1, wherein determining a response to the query based on the identified content in the program code further comprises:
identifying, by one or more processors, information associated with the identified content in program code in a network-accessible data resource; and
generating, by one or more processors, diagnostic information corresponding to the indicated error based on analyzing the identified information associated with the identified content in program code in the network-accessible data resource.

5. The method of claim 1, wherein the program code of the software product includes source code of the software product.

6. The method of claim 1, wherein receiving a query associated with a software product further comprises:
receiving, by one or more processors, a message to a virtual assistant chatbot that includes the query.

7. A computer program product comprising:
one or more computer readable storage media and program instructions stored on the one or more computer readable storage media, the program instructions comprising:
program instructions to receive a query associated with a software product, the query including an indication of an error;
program instructions to determine whether a response to the query is available in an accessible knowledge base;
in response to determining that a response to the query is not available in an accessible knowledge base, program instructions to identify content in program code of the software product that corresponds to the indicated error of the received query, wherein the content comprises a comment in the program code that includes an error code that corresponds to the indicated error in the received query; and
program instructions to determine a response to the query based on the identified content in the program code, the determined response to the query including diagnostic information corresponding to the indicated error.

8. The computer program product of claim 7, further comprising program instructions, stored on the one or more computer readable storage media, to:
send the determined response to a user that sent the query, wherein the diagnostic information included in the determined response includes troubleshooting instructions corresponding to the indicated error.

9. The computer program product of claim 7, further comprising program instructions, stored on the one or more computer readable storage media, to:
identify a comment in the program code of the software product that is associated with the indicated error included in the query; and
generate diagnostic information corresponding to the indicated error based on analyzing the identified comment in the program code.

10. The computer program product of claim 7, wherein the program instructions to determine a response to the query based on the identified content in the program code further comprise program instructions to:
identify information associated with the identified content in program code in a network-accessible data resource; and
generate diagnostic information corresponding to the indicated error based on analyzing the identified information associated with the identified content in program code in the network-accessible data resource.

11. The computer program product of claim 7, wherein program code of the software product includes source code of the software product.

12. The computer program product of claim 7, wherein the program instructions to receive a query associated with a software product further comprise program instructions to:
receive a message to a virtual assistant chatbot that includes the query.

13. A computer system comprising:
one or more computer processors;
one or more computer readable storage media; and
program instructions stored on the one or more computer readable storage media for execution by at least one of the one or more processors, the program instructions comprising:
program instructions to receive a query associated with a software product, the query including an indication of an error;
program instructions to determine whether a response to the query is available in an accessible knowledge base;
in response to determining that a response to the query is not available in an accessible knowledge base, program instructions to identify content in program code of the software product that corresponds to the indicated error of the received query, wherein the content comprises a comment in the program code that includes an error code that corresponds to the indicated error in the received query; and program instructions to determine a response to the query based on the identified content in the program code, the determined response to the query including diagnostic information corresponding to the indicated error.

14. The computer system of claim 13, further comprising program instructions, stored on the computer readable storage media for execution by at least one of the one or more processors, to:

send the determined response to a user that sent the query, wherein the diagnostic information included in the determined response includes troubleshooting instructions corresponding to the indicated error.

15. The computer system of claim 13, further comprising program instructions, stored on the computer readable storage media for execution by at least one of the one or more processors, to:

identify a comment in the program code of the software product that is associated with the indicated error included in the query; and generate diagnostic information corresponding to the indicated error based on analyzing the identified comment in the program code.

16. The computer system of claim 13, wherein the program instructions to determine a response to the query based on the identified content in the program code further comprise program instructions to:

identify information associated with the identified content in program code in a network-accessible data resource; and generate diagnostic information corresponding to the indicated error based on analyzing the identified information associated with the identified content in program code in the network-accessible data resource.

17. The computer system of claim 13, wherein the program code of the software product includes source code of the software product.

18. The computer system of claim 13, wherein the program instructions to receive a query associated with a software product further comprise program instructions to:

receive a message to a virtual assistant chatbot that includes the query.

* * * * *